(12) United States Patent
Yasuda et al.

(10) Patent No.: US 6,754,275 B1
(45) Date of Patent: Jun. 22, 2004

(54) DECODING DEVICE AND METHOD FOR DECIDING THE NEXT DECODED FRAME BASED ON THE FRAME INTERVAL

(75) Inventors: Makoto Yasuda, Nagaokakyo (JP); Tadashi Shibata, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/450,129

(22) Filed: Nov. 26, 1999

(30) Foreign Application Priority Data

Nov. 27, 1998 (JP) .......................................... 10-338084

(51) Int. Cl.$^7$ .............................................. H04N 7/12
(52) U.S. Cl. ............................................. 375/240.25
(58) Field of Search ...................... 375/240.25; 386/86; H04N 7/12

(56) References Cited

U.S. PATENT DOCUMENTS 5,799,129 A    8/1998  Muto
5,887,110 A  * 3/1999  Sakamoto et al. ............ 386/68

FOREIGN PATENT DOCUMENTS

JP    6-133304    5/1994
JP    7-95536     4/1995

* cited by examiner

Primary Examiner—Young Lee
(74) Attorney, Agent, or Firm—Wenderoth, Lind & Ponack, L.L.P.

(57) ABSTRACT

A smooth reproduced picture is produced at inverse playback, without losing of naturality of display. Picture output candidate frames are decided such that intervals between frame are uniform on a time axis at a normal playback. When the candidate frame exists in a group of pictures (GOP) preceding a GOP which is presently displayed and a number of frames in the GOP is unknown, a frame among one of a last or a second to last I or P coded frame in the GOP, which is nearer to a true picture output frame is decided as a picture output candidate frame.

4 Claims, 13 Drawing Sheets output pictures at normal playback (display order)

input bitstream (coding order)

contents of frame memories

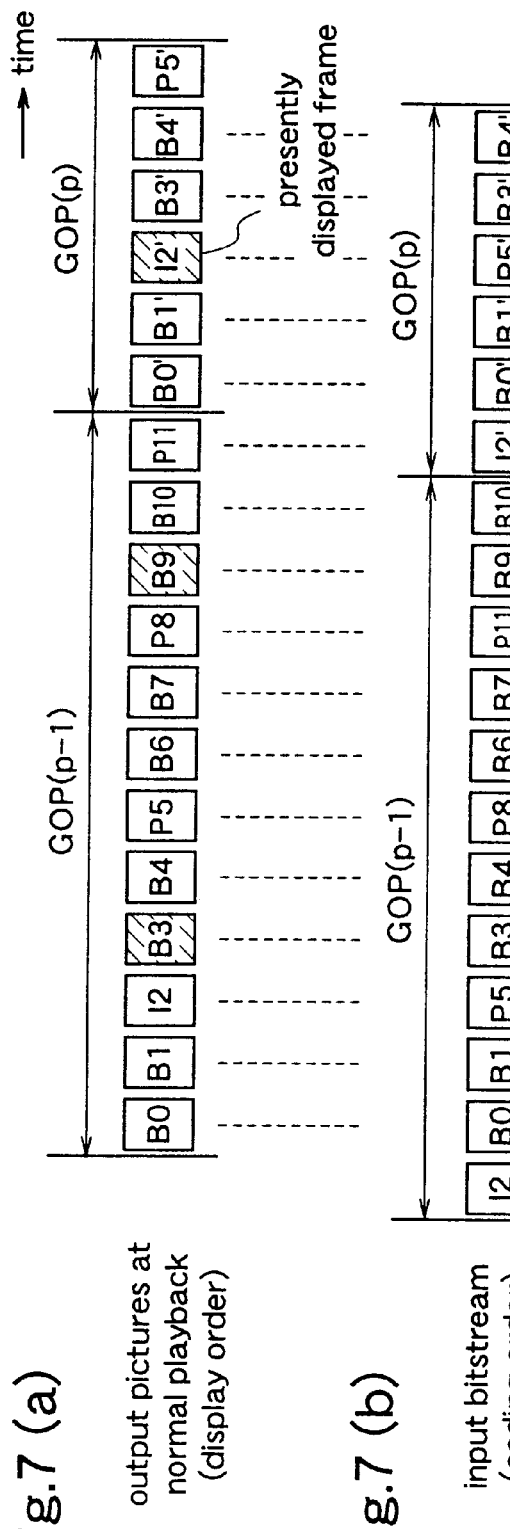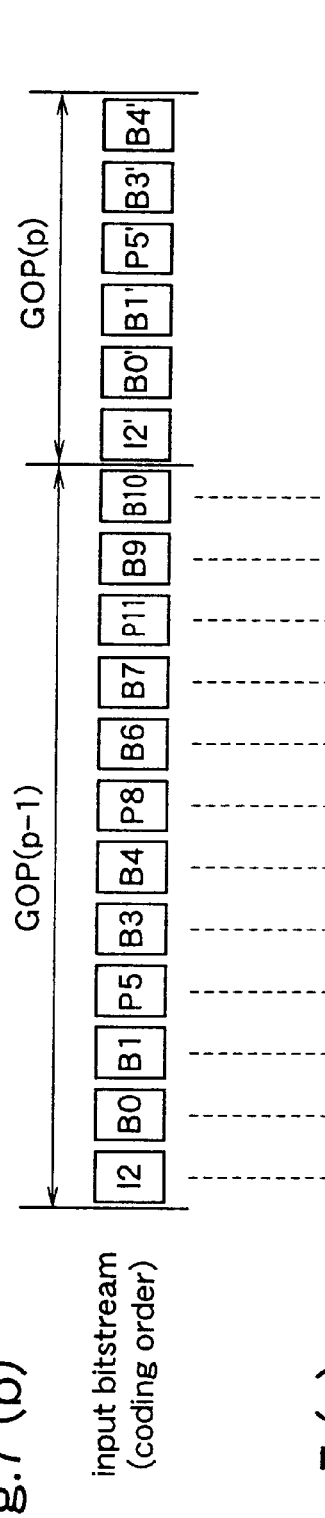
Fig.7 (a) output pictures at normal playback (display order)
Fig.7 (b) input bitstream (coding order)
Fig.7 (c) contents of frame memories

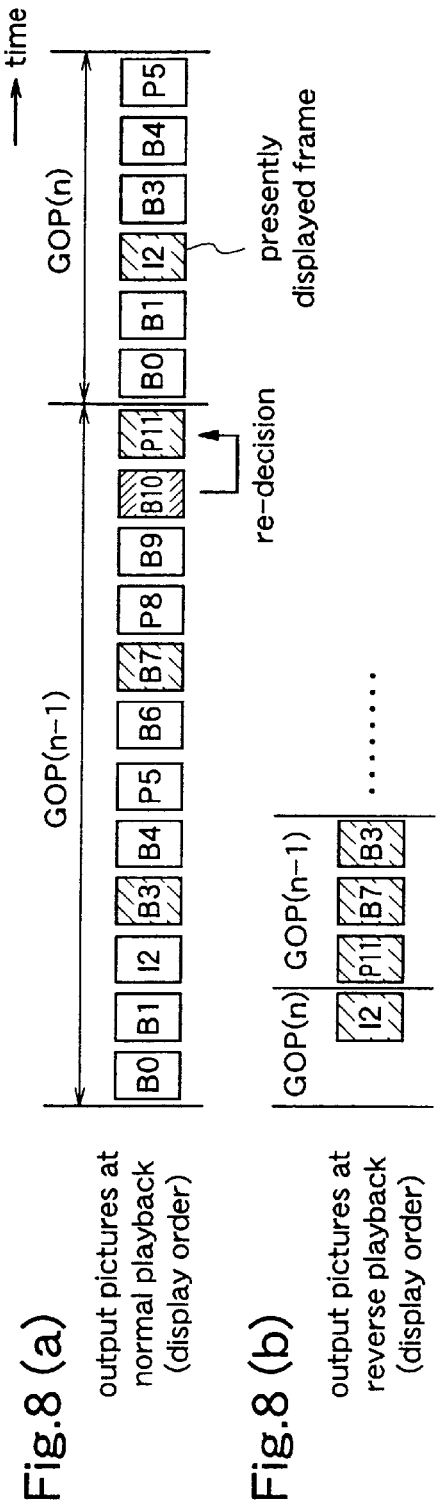

Fig.9 (a) output pictures at normal playback (display order)

Fig.9 (b) output pictures at reverse playback (display order)

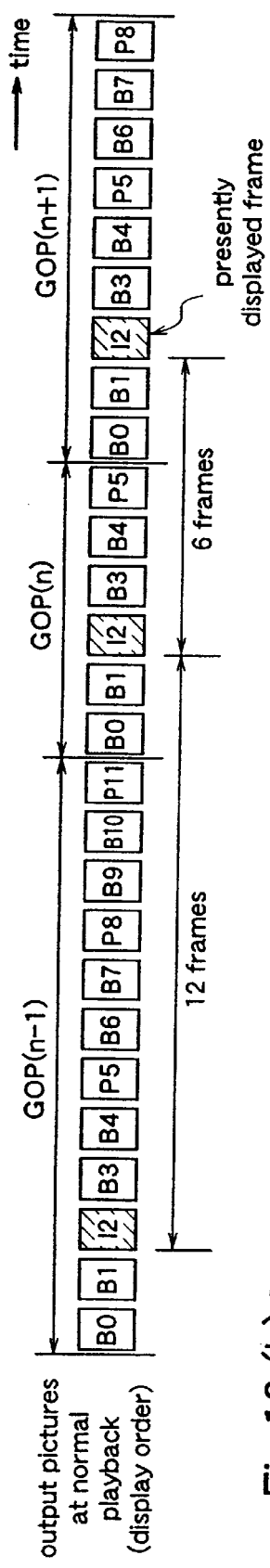
Fig.13 (a) PRIOR ART
Fig.13 (b) PRIOR ART

DECODING DEVICE AND METHOD FOR DECIDING THE NEXT DECODED FRAME BASED ON THE FRAME INTERVAL

FIELD OF THE INVENTION

The present invention relates to a decoding device and a decoding method and, more particularly, to a decoding device and a decoding method which improve the quality of pictures at inverse playback when moving pictures stored in a storage memory are reproduced.

BACKGROUND OF THE INVENTION

Recently, with the development of the information society, there is a growing request to transmit moving pictures to others beyond the walls of time and distance. An era when the digital technology is put into practical use in full scale has opened, and thus moving pictures have been enabled to be recorded/reproduced by a recording device or transmitted by long distance using a communication network. Further, not only in the field of communication, but also in the field of broadcasting, a transmission and coding method using the digital technology is adopted.

Since digital signals of a moving picture or sound signals generally have a large amount of codes, the utilization of high-efficiency coding technology is considered to be indispensable to efficiently record and transmit the signals, and coding devices and decoding devices have already been put into practical use.

A method based on a method which is described in International Standard System "Information Technology—Coding of moving pictures and associated audio for digital storage media at up to about 1.5 Mbits/s (ISO/IEC11172-2)", commonly called MPEG (Moving Picture Experts Group) System, is sometimes used as the above-described, high-efficiency coding technology.

A video CD which is a CD (compact disk) having digital moving pictures recorded thereon or a DVD having digital moving pictures of higher quality and longer time than those recorded on a video CD, which are recorded thereon, is one of the applications.

In a decoding device using a storage media, like a player for these video CDs or DVDs, not only the normal playback function for reproducing moving pictures from the past to the future on a time axis, but also the inverse playback function for reproducing moving pictures from the future to the past are essential.

Hereinafter, a prior art decoding method utilizing the method described in MPEG will be explained with reference to drawings.

Initially, a method for coding a digital moving picture in a MPEG system and a bitstream therein will be described.

In a MPEG system, it is assumed that a digital moving picture is constituted by a series of video frames, and a series of video frame groups which is referred to as a sequence comprising a plurality of the video frames is coded. The sequence is divided into a series of video frame groups, each normally having a time length of about 0.5 sec. to be subjected to coding, and each of which is referred to as a Group of Pictures (hereinafter, referred to as a GOP).

The GOP is constituted by I (intra) coded frames, which I coded frame is coded by using only data of the video frame by itself, P (predictive) coded frames, which P coded frame can be prediction-coded with reference to data of temporally previous frames (I coded frames and P coded frames), and B (bi-directionally predictive) coded frames, which B coded frame can be bi-directionally prediction-coded with reference to I coded frames and P coded frames which are temporally previous or subsequent.

Next, a method of inverse playback in a MPEG bitstream will be described.

At the normal playback, all pictures in a bitstream are decoded and displayed. On the other hand, at the inverse playback, a bitstream of each GOP is repeatedly transferred to a decoding device, temporally going back from the future to the past, and only the first frame included in each GOP is successively decoded and displayed. These situations are shown in FIGS. 13(a) and (b). FIG. 13(a) illustrates output pictures at the normal playback, showing all frames included in a stream. Here, GOP(n) represents an n-th GOP from the head of a sequence. At the inverse playback, the streams of GOPs are transferred in a descending order of, like GOP (n+1), GOP(n), GOP (n−1) and only the first I coded frames (12 coded frames, respectively) included in the respective GOPs are decoded and displayed (see FIG. 13(b)).

The prior art decoding method is constituted as described above, and at the inverse playback, as shown in FIG. 13(a), a reproduced picture is constituted by images at an interval of 6 frames or 12 frames, depending on the numbers of frames in GOPs included in supplied bitstreams, and results in dispersion. Consequently, a smooth reproduced picture cannot be obtained. Particularly when reproducing a stream which is optimized to be coded with an I coded frame which can be coded with high quality when a scene change is generated where there is a great possibility of the lengths of GOPs varying, in order to obtain high quality of pictures, the numbers of frames included in GOPs are variable, whereby a smooth reproduced picture cannot be obtained.

SUMMARY OF THE INVENTION

It is an object of the present invention to provide a decoding device and a decoding method which can realize a smooth reproduced picture without losing naturality in the reproduced picture at the inverse playback.

Other objects and advantages of the present invention will become apparent from the detailed description and specific embodiments described are provided only for illustration since various additions and modifications within the spirit and scope of the invention will be apparent to those of skill in the art from the detailed description.

According to a 1st aspect of the present invention, a decoding device which divides a moving picture into a plurality of continuous picture groups, receives a code sequence which is obtained by performing coding processing to each of the picture groups as an input, and decodes independently coded frames which are coded independently within pictures, and predictively coded frames which are coded with reference to other frames of different times, to obtain a decoded picture, comprises: means for setting a frame interval for selecting frames at a prescribed interval from continuous frames; means for deciding, with a first frame which is presently displayed in the continuous frames as a reference point, a frame which is to be decoded later, on the basis of the frame interval set by the frame interval setting means; and decoding means for decoding a code sequence corresponding to the frame decided by the picture output candidate frame deciding means. Therefore, frames which are selected at a uniform playback interval on a time axis at the normal playback are decided as picture output candidate frames and thereby the number of picture output frames increases, whereby a smooth reproduced picture is obtained.

According to a 2nd aspect of the present invention, in the decoding device of the 1st aspect, when the number of frames in a second picture group preceding a first picture group including the first frame is unknown, the picture output candidate frame deciding means analyze types of coded frames and the numbers of respective type coded frames, which are included in the code sequence, to determine the number of the frames, and thereafter decide the picture output candidate frame. Therefore, the same effects as those of the 1st aspect are obtained.

According to a 3rd aspect of the present invention, in the decoding device of the 1st aspect, when the number of frames in a second picture group preceding a first picture group including the first frame is unknown, the picture output candidate frame deciding means decide a predictively coded frame or an independently coded frame, which is located last in the second picture group, as the picture output candidate frame. Accordingly, when the number of frames in a preceding picture group is unknown, a code sequence of the preceding picture group is analyzed to determine the number of the frames, and a frame which is most recently decoded among two frames of a predictively coded frame and an independently coded frame stored in frame memories at this time is decided as a picture output candidate frame. Therefore, the reading operation for determining the number of frames and the decoding operation can be performed simultaneously, whereby higher-speed inverse playback is realized.

According to a 4th aspect of the present invention, in the decoding device of the 1st aspect, when the number of frames in a second picture group preceding a first picture group including the first frame is unknown, the picture output candidate frame deciding means decide a predictively coded frame or an independently coded frame, which is located last but one in the second picture group, as the picture output candidate frame. Therefore, the same effects as those of the 3rd aspect are obtained.

According to a 5th aspect of the present invention, in the decoding device of the 1st aspect, when the number of frames in a second picture group preceding a first picture group including the first frame is unknown, the picture output candidate frame deciding means analyze the code sequence to determine the number of the frames in the second picture group and thereafter decide, as the picture output candidate frame, a frame which is nearer to the picture output candidate frame, among either a last predictively coded frame or a last independently coded frame in the second picture group, or a last but one predictively coded frame or a last but one independently coded frame in the second picture group. Therefore, the same effects as those of the 3rd aspect are obtained.

According to a 6th aspect of the present invention, in the decoding device of any of the 2nd to 5th aspects, when the decided picture output candidate frame cannot be completely decoded with only a code sequence corresponding to the second picture group, the picture output candidate frame deciding means decide a first independently coded frame included in the second picture group as the picture output candidate frame. Therefore, the same effects as those of the 3rd aspect are obtained.

According to a 7th aspect of the present invention, a decoding method which divides a moving picture into a plurality of continuous picture groups, receives a code sequence which is obtained by performing coding processing to each of the picture groups as an input, and decodes independently coded frames which are coded independently within pictures, and predictively coded frames which are coded with reference to other frames of different times, to obtain a decoded picture, comprises: a step of setting a frame interval for selecting frames at a prescribed interval from continuous frames; a step of deciding, with a first frame which is presently displayed in the continuous frames as a reference point, a frame which is to be decoded later, on the basis of the set frame interval; and a decoding step of decoding a code sequence corresponding to the frame decided in the picture output candidate frame deciding step. Therefore, frames which are selected at a uniform playback interval on a time axis at the normal playback are decided as picture output candidate frames and thereby the number of picture output frames increases, whereby a smooth reproduced picture is obtained.

According to an 8th aspect of the present invention, in the decoding method of the 7th aspect, the picture output candidate frame deciding step comprises: a step of judging whether the number of frames in a second picture group preceding a first picture group including the fist frame is unknown or not; a step of, when it is judged in said number of frames judging step that the number of the frames is unknown, analyzing types of coded frames and the numbers of respective type coded frames, which are included in the code sequence, to determine the number of the frames. Therefore, the same effects as those of the 7th aspect are obtained.

According to a 9th aspect of the present invention, in the decoding method of the 7th aspect, the picture output candidate frame deciding step comprises: a step of judging whether the number of frames in a second picture group preceding a first picture group including the first frame is unknown or not; and a step of, when it is judged in the number of frames judging step that the number of the frames is unknown, deciding a predictively coded frame or an independently coded frame, which is located last in the second picture group, as the picture output candidate frame. Accordingly, when the number of frames in a preceding picture group is unknown, a code sequence of the preceding picture group is analyzed to determine the number of the frames, and a frame which is most recently decoded among two frames of a predictively coded frame and an independently coded frame stored in frame memories at this time is decided as a picture output candidate frame. Therefore, the reading operation for determining the number of frames and the decoding operation can be performed simultaneously, whereby higher-speed inverse playback is realized.

According to a 10th aspect of the present invention, in the decoding method of 7th aspect, the picture output candidate frame deciding step comprises: a step of judging whether the number of frames in a second picture group preceding a first picture group including the first frame is unknown or not; and a step of, when it is judged in the number of frames judging step that the number of the frames is unknown, deciding a predictively coded frame or an independently coded frame, which is located last but one in the second picture group, as the picture output candidate frame. Therefore, the same effects as those of the 9th aspect are obtained.

According to an 11th aspect of the present invention, in the decoding method of the 7th aspect, the picture output candidate frame deciding step comprises: a step of judging whether the number of frames in a second picture group preceding a first picture group including the first frame is unknown or not; a step of, when it is judged in the number of frames judging step that the number of the frames is unknown, analyzing types of coded frames and the numbers of the respective type coded frames, which are included in the code sequence, to determine the number of the frames; and a step of selecting a frame which is nearer to the picture output candidate frame, among either a last predictively coded frame or a last independently coded frame in the second picture group, or a last but one predictively coded frame or a last but one independently coded frame in the second picture group and deciding the frame as the picture output candidate frame. Therefore, the same effects as those of the 9th aspect are obtained.

According to a 12th aspect of the present invention, in the decoding method of any of the 8th to 11th aspects, the picture output candidate frame deciding step comprises: a step of judging whether the decided picture output candidate frame can be completely decoded with only a code sequence corresponding to the second picture group; and a step of, when it is judged in said decoding state judging step that the decoding cannot be completely performed with only the code sequence corresponding to the second picture group, designating a first independently coded frame included in the second picture group and deciding the frame as the picture output candidate frame. Therefore, the same effects as those of the 9th aspect are obtained.

BRIEF DESCRIPTION OF THE DRAWINGS

FIGS. 7(a)–(c) are diagrams for explaining how to use frame memories when decoding processing is performed by using a decoding method according to the second embodiment.

FIGS. 8(a)–(c) are diagrams for explaining decoding processing using the decoding method according to the second embodiment.

FIGS. 9(a)–(c) are diagrams for explaining decoding processing using the decoding method according to the second embodiment.

FIGS. 13(a)–(b) are diagrams for explaining a prior art decoding method.

DETAILED DESCRIPTION OF THE PREFERRED EMBODIMENTS (Embodiment 1)

Figure 1:
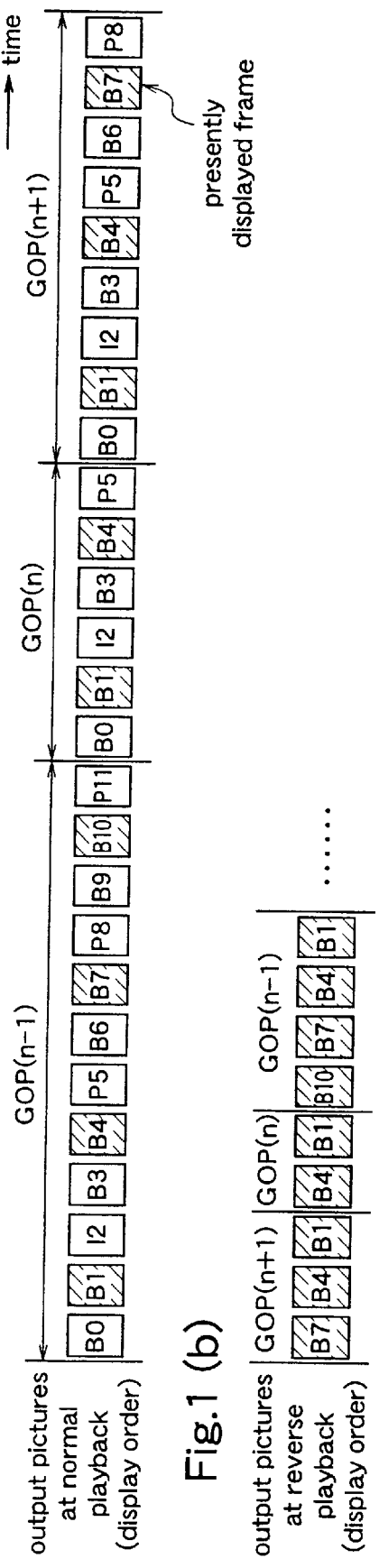
FIGS. 1(a)–(c) are diagrams for explaining a decoding method according to a first embodiment of the present invention along a time axis.

Hereinafter, a decoding device and a decoding method according to the first embodiment will be described with reference to the drawings. FIGS. 1(a)–(c) are diagrams for explaining the decoding method according to the first embodiment on a time axis.

At the inverse playback, as shown by diagonally shaded parts in FIG. 1(a), frames which are selected at a uniform playback interval on a time axis at the normal playback are decided as picture output candidate frames. Here, the picture output candidate frame means a frame that is expected to be picture output at the inverse playback. That is, assuming that a coded frame B7 in GOP (n+1) is displayed at present, with this point of time as a reference point, a next picture output candidate frame is appointed to a coded frame B4 in GOP (n+1), a frame which is in a past direction by a frame interval Nint which is previously set. Here, the frame interval Nint is a parameter indicating a distance between pictures which are output at the inverse playback. The larger this value is, the faster a sequence is inverse-reproduced. In this example, Nint=3 frames.

Figure 2:
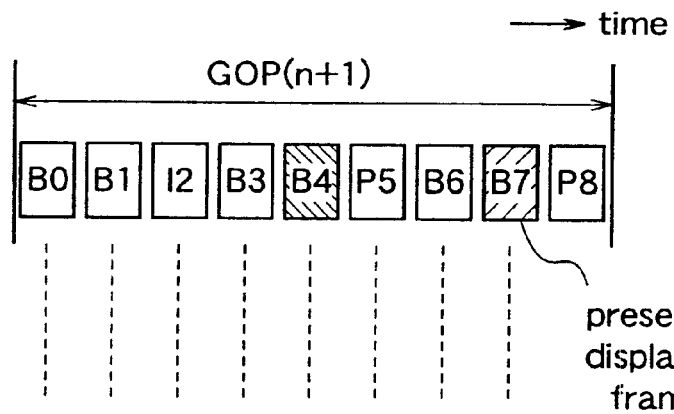
FIGS. 2(a)–(c) are diagrams for explaining how to use frame memories when decoding processing is performed by using the decoding method according to the first embodiment.
Figure 2:
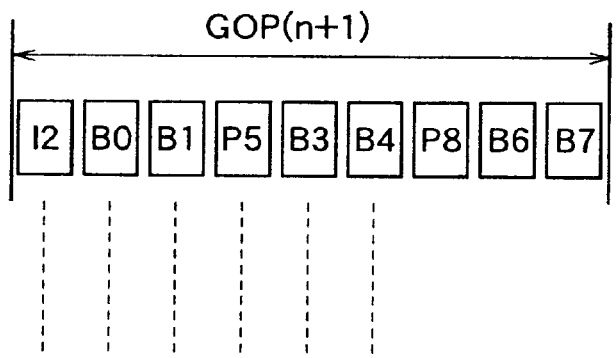
Figure 2:
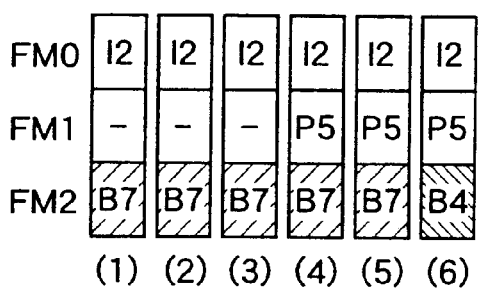

At the inverse playback, after the B4 coded frame in GOP (n+1) is displayed, a BI coded frame in GOP (n+1) is displayed and then a B4 coded frame in GOP (n) is displayed. In this way, as shown in FIG. 1(b), frames are successively displayed every prescribed number of frames. In the decoding method according to the first embodiment, in order to output a picture of each picture output candidate frame, a request for a stream of a GOP which is required to decode the frame is issued to the outside and the picture of the picture output candidate frame is created each time. Hereinafter, the processing will be described by taking the B4 coded frame in GOP(n+1) as an example. To create the B4 coded frame in GOP(n+1), not only a bitstream of the B4 coded frame itself, but also frames having the possibility of being referred to at its decoding, i.e., I2 and P5 coded frames which are before and after the B4 coded frame in GOP(n+1), are required. All these frames can be obtained by simply decoding only a stream of GOP(n+1). Therefore, in this case, a request for the stream of GOP(n+1) is issued to the outside. A method for decoding the B4 coded frame in GOP(n+1) at this time will be described with reference to FIGS. 2(a)–(c). Usually, decoding processing in MPEG is performed using frame memories of three frames. One frame memory is used as an output buffer for B coded frames and two frame memories are used for storing I and P coded frames. Also at the inverse playback, a picture output candidate frame is decoded by utilizing these three frames and a picture of the picture output candidate frame is output. The operation is shown in FIGS. 2(b) and (c). FIG. 2(b) illustrates a GOP (n+1) stream which is input to output a picture of the B4 coded frame. FIG. 2(c) is a diagram showing how the contents of the frame memories change with the decoding of the stream in FIG. 2(b). In this case, frame memories FM0 and FM1 are used for creating reference frames and a frame memory FM2 is used for B coded frames. A B7 coded frame displayed at present is stored in the frame memory FM2 and in order to continuously display this frame during the processing for decoding GOP(n+1), this frame should not be destroyed.

Accordingly, by using the remaining frame memories FM0 and FM1, I and P coded frames are successively decoded until a frame of a desired frame number, i.e., a picture output candidate frame is found (see (1)–(5) in FIG. 2(c)). Here, B coded frames other than the picture output candidate frame are thrown out after being read. Then, when the frame of the desired frame number is found, the frame is decoded and displayed (see (6) in FIG. 2(c)). In this case, only I and P coded frames are read and decoded because I and P coded frames have the possibility of being utilized as reference frames when the picture output candidate frame is a P or B coded frame.

Next, taking a B1 coded frame in GOP (n+1) as an example, the operation will be described. To create the B1 coded frame in GOP (n+1), not only a bitstream of the B1 coded frame itself but also reference frames before and after the B1 coded frame, which have the possibility of being referred to at a decoding time, i.e., a P5 coded frame in GOP(n) and an 12 coded frame in GOP(n+1) are required. That is, streams of two GOPs of GOP(n) and GOP(n+1) are required. FIG. 1(c) shows relationships between respective picture output candidate frames in the above-described case and streams of GOPs required to be picture output. However, in the above-described decoding method, the picture output candidate frames cannot always be decided immediately. Such situations and solutions therefor will be described next.

In the above-described decoding method, in deciding picture output candidate frames, when an adjacent GOP is not required to proceed to a next picture output candidate frame, the frame numbers of the picture output candidate frames can be decided by subtracting the frame interval Nint successively from the frame number of the presently displayed frame. However, when an adjacent GOP is required to proceed to a next picture output candidate frame, the frame number of the picture output candidate frame cannot be decided immediately if the number of frames in the previous GOP is not known.

When the inverse playback is continued steadily, the picture output candidate frames are constantly decided in a direction from the future to the past. Therefore, taking a wide view of this situation, transfer requests for streams of GOPs similarly go back from the future to the past and thus the past streams are not yet known to the decoding device. In this case, since the number of frames in the past GOP is unknown, the frame number of a frame to be picture output cannot be decided quickly.

However, the above-described situation does not always occur. For example, in FIG. 1(a), when a picture of the B1 coded frame in GOP(n) is to be output, streams of GOP(n−1) and GOP(n) are requested. Therefore, when GOP(n−1) is decoded, the number of frames in GOP(n−1) can be known at the same time as a P11 coded frame in GOP(n−1) which is a forward reference frame is decoded. Accordingly, the number of frames in GOP(n−1) becomes known at that time and then, a B10 coded frame in GOP(n−1) as a picture output candidate frame is identified immediately. FIG. 1(c) shows respective picture output candidate frames and changes of whether the numbers of frames in the GOPs are known/unknown when the picture output candidate frames are decided. In the figure, a part enclosed with an ellipse designates that the number of frames becomes known at that point of time. Assuming that when the B7 coded frame in GOP(n+1) is decided as a picture output candidate frame, the numbers of frames in GOP(n−1), GOP(n), and GOP(n−1) are unknown as shown at the top column in FIG. 1(c)., when the B4 coded frame in GOP(n+1) is decided next as a picture output candidate frame, the number of frames in GOP(n+1) has already been known when the picture of the B7 coded frame is output, as shown at the next column. Further, when a picture of the B1coded frame in GOP(n+1) is output, the number of frames in GOP(n) becomes known. Further, when a picture of the B4 coded frame in GOP(n) is output, the status (known or unknown) of the numbers of respective frames in GOP(n−1), GOP(n), and GOP(n+1) does not change from when the B1coded frame in GOP(n+1) is picture output, and when a picture of the B1coded frame in GOP(n) is output, the number of frames in GOP(n−1) becomes known. Hereinafter, the numbers of frames in GOPs become known in a similar way.

In this first embodiment, in order to solve the above-described status, in order to decide the number of frames (Np) in a past GOP, transfer request for a stream of a GOP preceding by one GOP is issued once, the stream is analyzed to obtain Np, thereby deciding a picture output candidate frame, and thereafter, the stream is requested again and a desired frame is decoded and displayed.

Figure 3:
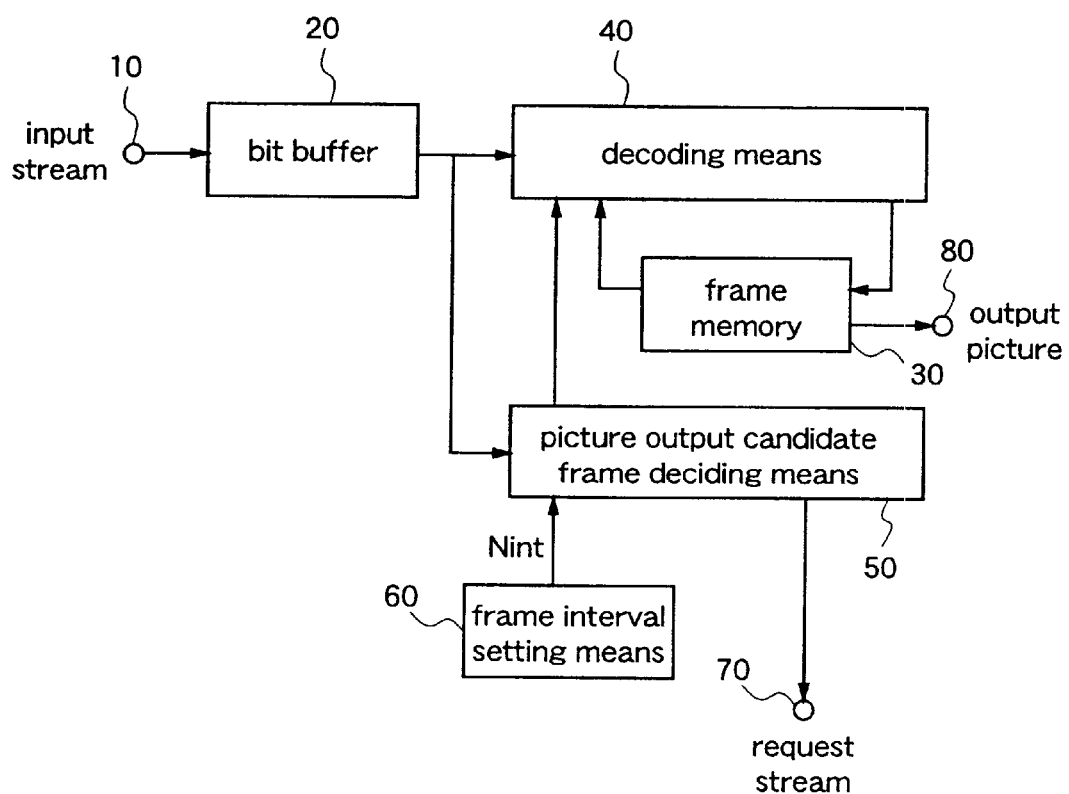
FIG. 3 is a block diagram illustrating a decoding device for realizing coding processing by using a decoding method according to the first or a second embodiment of the present invention.

Next, a description is given of a decoding device which performs decoding processing by using the decoding method according to this first embodiment, with reference to the drawings. In FIG. 3, reference numeral 10 denotes an input terminal for a stream. Numeral 20 denotes a bit buffer for storing the stream which is input to the input terminal 10. Numeral 30 denotes a frame memory in which decoded pictures are stored. Numeral 40 denotes a decoding means for receiving a bitstream and decoding the same. Numeral 50 denotes a picture output candidate frame deciding means for deciding a candidate frame, a picture of which is to be output. Numeral 60 designates a frame interval setting means for designating a time interval between picture output candidate frames decided by the picture output candidate frame deciding means 50. Usually, the frame interval setting means has a prescribed value as an initial value, but the frame interval can also be arbitrarily set from the outside. Numeral 70 denotes an output terminal for a stream request. Numeral 80 denotes an output terminal for a picture.

Hereinafter, an operation of the decoding device constructed as described above will be described.

Initially, a stream which is input to the input terminal 10 is input to the decoding means 40 through the bit buffer 20. The stream is decoded by the decoding means 40, by referring to the decoded pictures stored in the frame memory 30 as required, and a decoded picture of the stream is stored in the frame memory 30. The decoded pictures stored in the frame memory 30 are read out by the picture output candidate frame deciding means 50 in an appropriate order and output from the output terminal 80.

On the other hand, an output of the bit buffer 20 is also input to the picture output candidate frame deciding means 50. The picture output candidate frame deciding means 50 receives the frame interval set by the frame interval setting means 60 as an input, decides a picture output candidate frame at the inverse playback, and controls the decoding means 40 and the frame memory 30 to obtain the picture output candidate frame. In addition, the picture output candidate frame deciding means 50 sends a request for a stream of a GOP which is required to obtain the picture output candidate frame to the outside through the output terminal 70.

Figure 4:
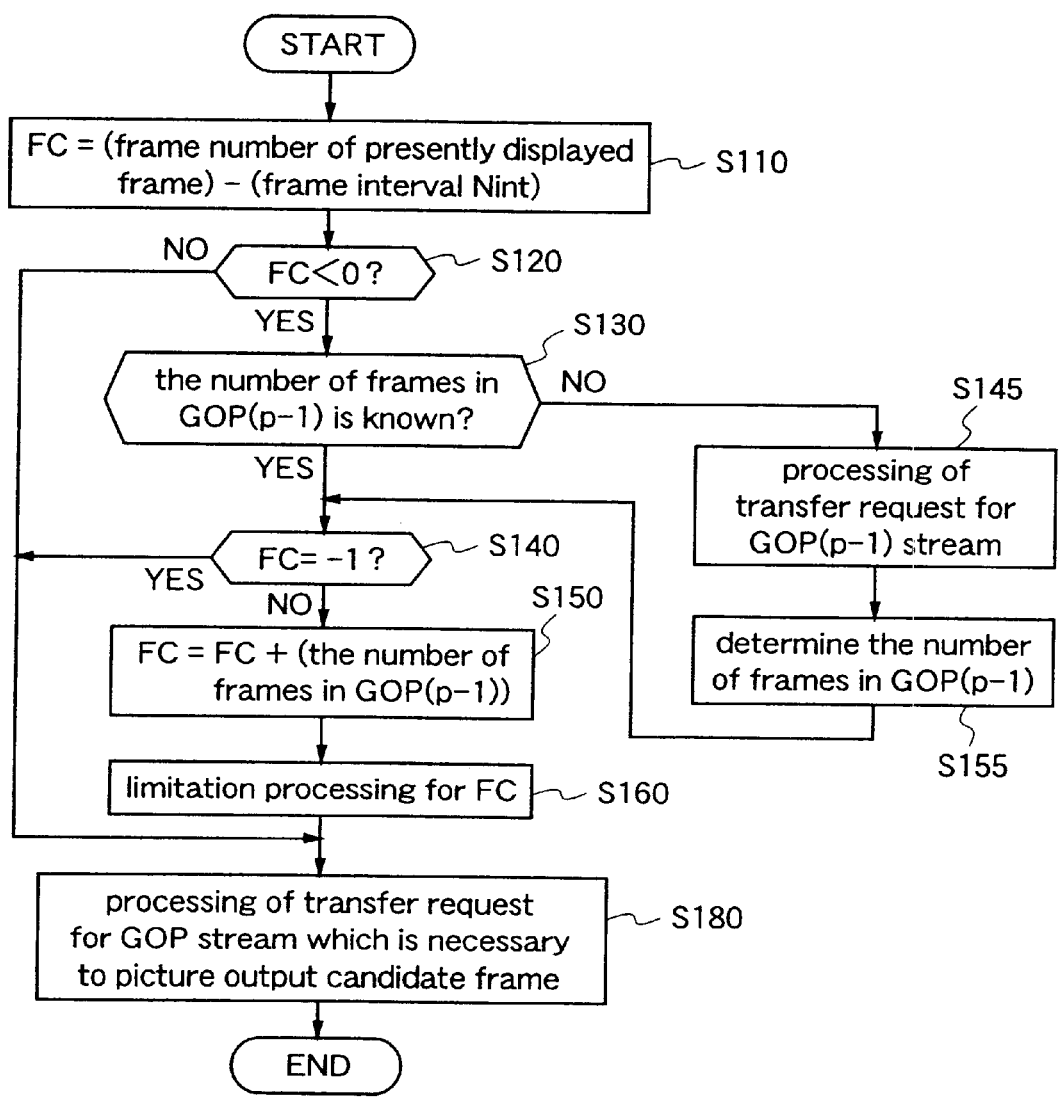
FIG. 4 is a flowchart showing an operation of a picture output candidate frame deciding means.

Next, how to decide a picture output candidate frame by the picture output candidate frame deciding means 50 will be described hereinafter, with reference to a flowchart in FIG. 4. Initially, a picture output candidate frame number FC which is a frame number of a picture output candidate frame is obtained by subtracting a frame interval setting signal Nint from a frame number of a presently displayed frame (processing S110). Here, the frame interval setting signal Nint is set by the frame interval setting means 60.

Next, this FC is compared with 0 (processing S120), and when FC is 0 or greater, it is judged that a frame to be displayed next exists in this GOP. Then, processing of requesting transfer of a GOP that is required to picture output of the picture output candidate frame of FC is performed (processing S180). The GOP that is requested at this time is the same as that described in FIG. 1(c) as an example.

When it is judged from the result of the processing S120 that FC is below 0, it is judged that the frame to be displayed next does not exist in this GOP. Then, it is judged whether the number of frames in a GOP (hereinafter, referred to as GOP (p-1)) which is one GOP before a GOP (hereinafter, referred to as GOP(p)) which includes the presently displayed frame is known (processing S130). When it is known, FC is compared with -1 (processing S140) and when it does not coincide with -1, the frame is not the last frame in GOP (p-1). Therefore, a value obtained by adding the number of frames in GOP(p-1) to FC is newly set as FC (processing S150). Further, when it is judged from the result of the processing S140 that FC coincides with -1, it is judged that this frame is the last frame in GOP(p-1) and then it proceeds to processing S180.

On the other hand, when it is judged from the result of the processing S130 that the number of frames in GOP(p-1) is unknown, the transfer request for a stream of GOP(p-1) is issued (processing S145), and the stream of GOP(p-1) which is input from the outside as the result of the request is analyzed to determine the number of frames included therein (processing S155). By this processing, the number of frames in GOP(p1) is decided.

Figure 5:
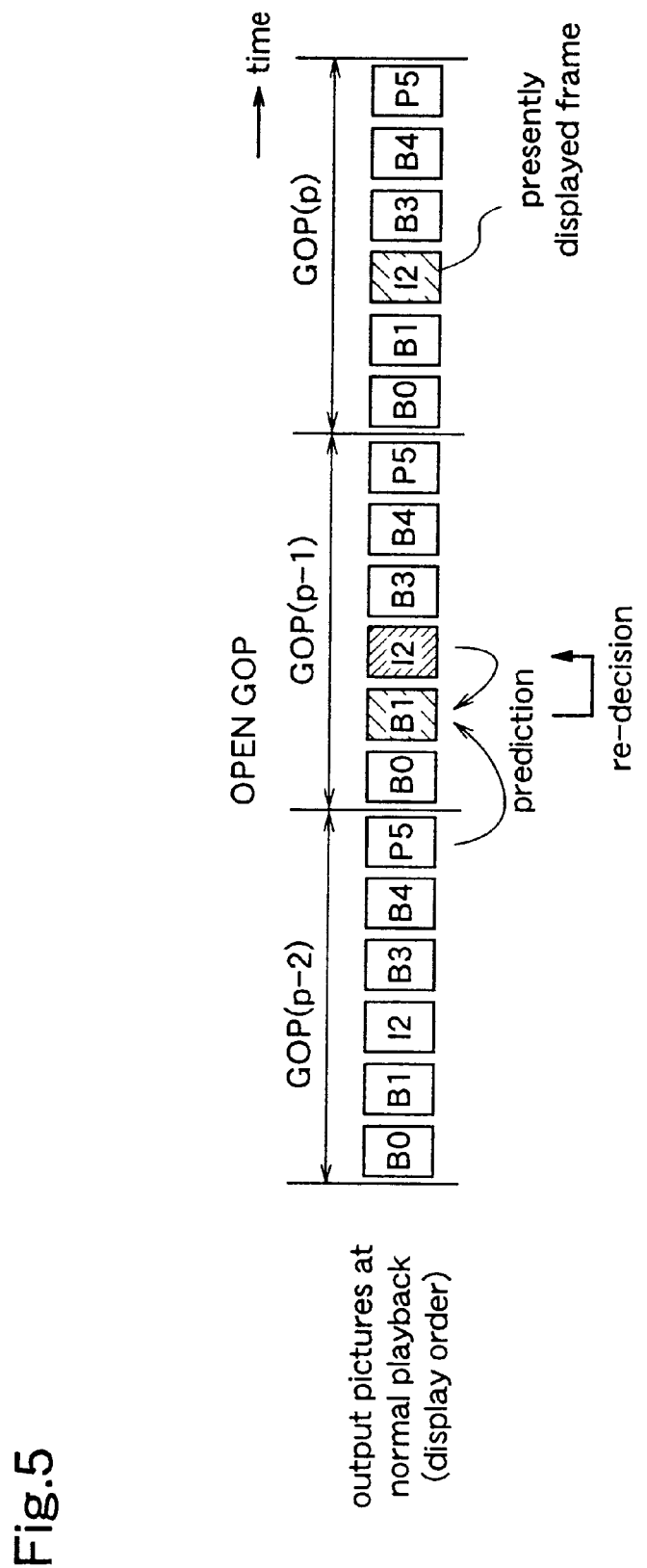
FIG. 5 is a diagram for explaining processing S160.

After the processing S150, a prescribed limitation is imposed to FC as required (processing S160) and then it proceeds to processing S180. This processing is performed when a picture output candidate frame cannot be decoded completely only with the requested stream, to reset a first I coded frame in GOP(p-1) as a picture output candidate frame. This corresponds to a case where GOP(p-1) is an open GOP and a B coded frame preceding the first I coded frame in GOP(p-1) in a display order (B1 coded frame in GOP(p-1) in this example) is decided as a picture output candidate frame, as shown in FIG. 5. When such a B coded frame is decoded, the last I or P coded frame in GOP(p-2) is required as a forward reference frame (P5 coded frame in GOP(p-2) in this example) and thus a stream of GOP(p-2) is further required. Since it takes time to transfer and decode the stream, a smooth reproduced picture is hard to obtain. Accordingly, by re-deciding the first I coded frame in GOP(p-1) in the display order as a picture output candidate frame, the picture of the picture output candidate frame can be quickly output without requiring a further past stream of GOP(p-2), thereby obtaining a smooth reproduced picture.

Figure 6:
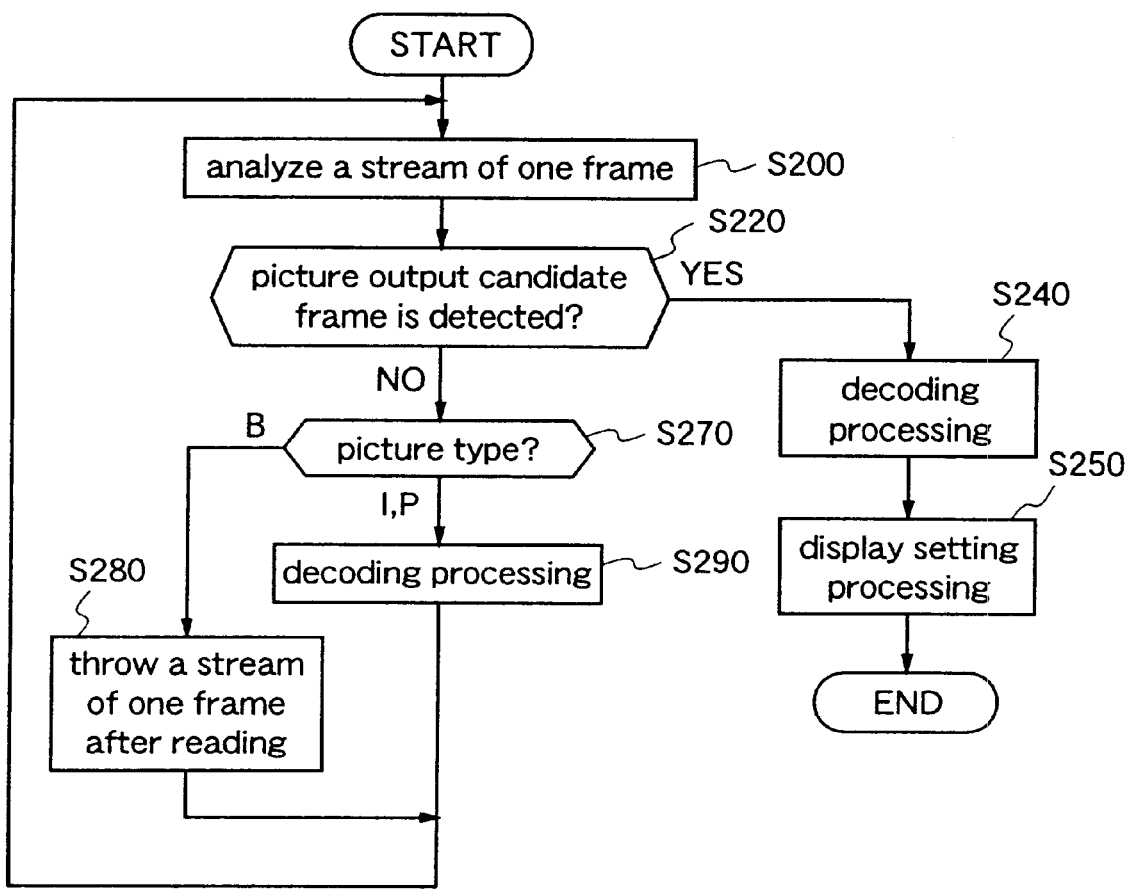
FIG. 6 is a flowchart showing an operation of a decoding means.

Hereinafter, decoding processing by the decoding means 40 will be mainly described, with reference to a flowchart in FIG. 6 for explaining how to decode a picture output candidate frame by the decoding means 40. Initially, processing for analyzing a stream of one frame among a GOP stream, a transfer request for which stream is issued to the outside, is performed (processing S200). Then, it is judged whether a picture output candidate frame that is decided by the picture output candidate frame deciding means is detected (processing S220). That is, in the processing S220, it is judged whether the picture output candidate frame is detected by comparing FC with the analyzed GOP number and a frame number.

When it is judged from the result of the processing S220 that the picture output candidate frame is detected, the decoding processing for a stream thereof is performed (processing S240) and setting of display for that picture is performed (processing S250). At this time, a decoded picture is stored in the frame memory 30 and the picture output candidate frame deciding means 50 controls the frame memory 30 to output the decoded picture from the output terminal 80.

On the other hand, when it is judged from the result of the processing S220 that the picture output candidate frame is not detected, a picture type of the analyzed frame is judged (processing S270). When it is a B coded frame, a stream of one frame is thrown after being read (processing S280), and when it is an I or P coded frame, the decoding processing is performed (processing S290) and then it proceeds to processing S200. The decoded picture at this time is stored in the frame memory 30, but it is controlled by the picture output candidate frame deciding means 50 so as not to be displayed. During this time, a frame displayed immediately before is continuously displayed.

As described above, according to this first embodiment, by considering the presently displayed picture as a reference point, picture output candidate frames are decided such that the intervals between displayed pictures are uniform and decoded. Therefore, also at the inverse playback, pictures are reproduced at uniform frame intervals and the number of picture output frames increases relative to the prior art method which displays only the first I coded frame in each GOP, whereby a smooth reproduced picture is obtained.

In addition, when a next picture output candidate frame is decided, a stream of a GOP preceding by one GOP is requested to be transferred, the number of frames included in that stream is checked, and then the stream is requested again to decode candidate frame exists in an adjacent GOP, the picture output candidate frame can be decided immediately.

(Embodiment 2)

Next, a coding method according to the second embodiment of the present invention will be described. In the above-described first embodiment, in order to decide the number of frames in GOP(p-1) and decode a picture output candidate frame, a stream of GOP(p-1) should be transferred plural times. However, in this second embodiment, a method enabling to obtain one picture output frame by one time transfer of a stream of a GOP is provided, as a method which is suitable at higher-speed inverse playback.

Initially, it is described that a true picture output candidate frame sometimes cannot be displayed by one time transfer of a GOP(p-1) stream. As described also in the first embodiment, B coded frames other than picture output candidate frames are thrown out after being read, and I and P coded frames are decoded by using two faces of frame memories (see FIG. 2(c)).

In the above structure, at the completion of the decoding of GOP (p-1), the frame memories store only two of most recently decoded I and P coded frames at the maximum. Therefore, at a time when the last frame in GOP(p-1) is judged, the number of frames in GOP(p-1) is known and the true picture output candidate frame becomes apparent, but the stream was already thrown out after being read and does not exist in the bit buffer 20, whereby the true output candidate frame sometimes cannot be output. This situation is shown in FIGS. 7(a)–(c).

FIG. 7(a) shows a case where, while an I21 coded frame in GOP(p) is displayed, a frame preceding by five frames is decided as a picture output candidate frame. In this case, since the number of frames in GOP(p-1) is unknown, by only one time transfer of a stream of GOP(p-1) as shown in FIG. 7(b), the number of frames is known after the analysis of all streams is finished. That is, the frame number of the picture output candidate frame cannot be known in advance during the analysis/decoding processing for the stream of GOP(p-1). Therefore, as shown in FIG. 7(c), only P8 and P11 coded frames in GOP(p-1) remain in the frame memories after the analysis of the all streams is finished, whereby the B9 coded frame which is the true picture output candidate frame cannot be output.

Accordingly, a most recently decoded I or P coded frame (hereinafter, referred to as an IP1 frame) is decided as a picture output candidate frame, among two frames of I and P coded frames which are stored in the frame memories. This frame corresponds to the last frame in GOP(p−1) in display order.

Hereinafter, a frame that is output in place of the true picture output candidate frame is referred to as an alternate frame.

FIGS. 8(a)–(c) are diagrams for explaining an operation in the above-described case. Similar to the first embodiment, at the inverse playback, frames which are selected such that the playback intervals on the time axis at the normal playback are uniform are decided as picture output candidate frames (FIG. 8(a)).

Here, when, from a situation where an I2 coded frame in GOP(n) is displayed (the number of frames in GOP(n−1) is unknown), a next picture output candidate frame is decided, a stream of GOP(n) (corresponding to GOP(p−1)) is requested, and then a B10 coded frame in GOP(p−1) is found to be a true picture output candidate frame as a result of the analysis/decoding of the stream as described above, a P11 coded frame in GOP(n−1) is re-decided as a picture output candidate frame and displayed. That is, the P11 coded frame is output as an alternate frame. Of course, when the number of frames in GOP(n−1) is already known, the picture output candidate frame can be decided immediately. Therefore, the re-decision for the above-described picture output candidate frame is not performed, as similar to the case in the first embodiment. Consequently, outputs as shown in FIG. 8(b) are obtained at the inverse playback.

FIG. 8(c) shows respective picture output candidate frames and the above-described changes between known/unknown of the number of frames in GOPs at deciding of the picture output candidate frames.

In addition, while the IP1 frame is re-decided as the picture output candidate frame in the above-described method, a second newest I or P coded frame (hereinafter referred to as an IP2 frame) among two frames of I and P coded frames stored in the frame memories can be re-decided as a picture output candidate frame, in place of the IP1 frame. Here, when there is only one frame of an I or P coded frame in GOP(n−1), the IP1 frame is re-decided as the picture output candidate frame. This frame corresponds to an I or P coded frame which is in the last but one (second to last) position in GOP(n−1) in display order.

Figure 9C:
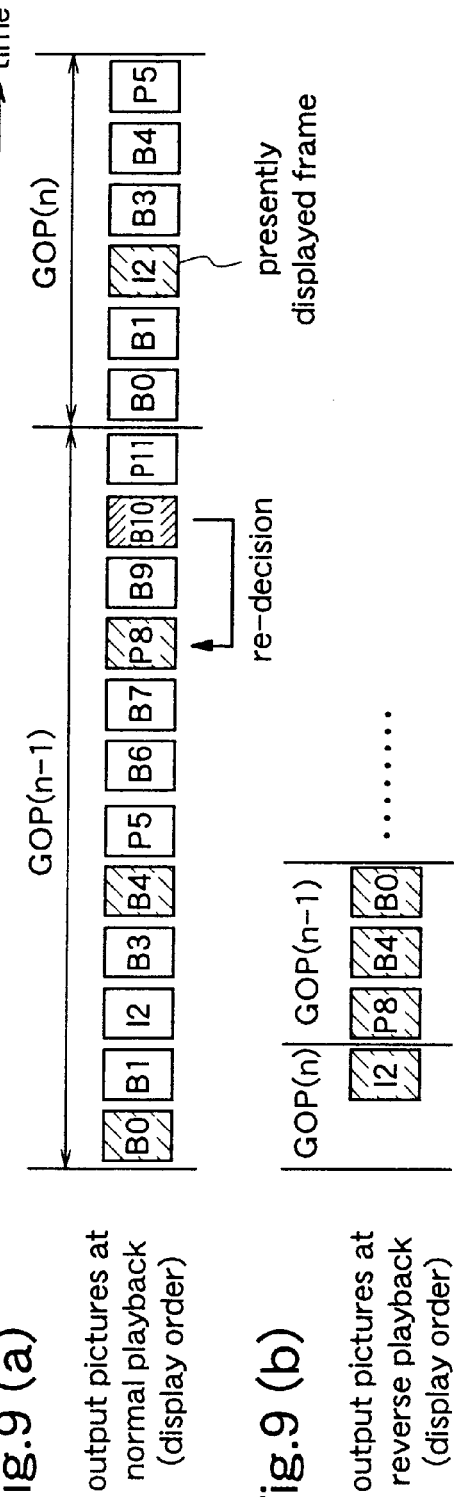

FIGS. 9(a)–(c) are diagrams for explaining an operation in the above-described case. At the inverse playback, frames which are selected at a uniform playback interval on the time axis at the normal playback are decided as picture output candidate frames (FIG. 9(a)). Here, when, from a situation where an I2 coded frame in GOP(n) is displayed (the number of frames in GOP(n−1) is unknown), a next picture output candidate frame is decided, a request for a stream of GOP(n) (corresponding to GOP(p−1)) is issued, and then a B10 coded frame in GOP(n−1) is found to be a true picture output candidate frame as a result of the analysis/decoding of the stream as described above, a P8 coded frame in GOP(n−1) is re-decided as a picture output candidate frame and displayed. That is, the P8 coded frame is output as an alternate frame. Of course, when the number of frames in GOP(n−1) is already known, the picture output candidate frame can be decided immediately. Therefore, the re-decision to the above-described picture output candidate frame is not performed, as similar to the case in the first embodiment. Consequently, at the inverse playback, outputs as shown in FIG. 9(b) are obtained.

FIG. 9(c) shows respective picture output candidate frames and the above-described changes between known/unknown of the number of frames in GOPs at the decision of the picture output candidate frames.

In addition, while one of the IP1 and IP2 frames is re-decided as the picture output candidate frame in the above-described method, the distances to the IP1 frame and the IP2 frame from the true picture output candidate frame which is found in the above process are measured and a nearer frame can be re-decided as a picture output candidate frame. Here, when there is only one frame of an I or P coded frame in GOP (n−1), the IP1 frame is re-decided as the picture output candidate frame. That is, in the case as shown in FIG. 8(a), when, from a situation where the I2 frame in GOP(n) is displayed (the number of frames in GOP(n−1) is unknown), the next picture output candidate frame is decided, the request for the stream of GOP(n) (corresponding to GOP(p−1)) is issued, and then the BIO coded frame in GOP(n−1) is found to be a true picture output candidate frame as a result of the analysis/decoding of the stream as described above, the distance between B1 0 coded frame and P11 coded frame as IP1 frame (one frame) is compared with the distance between B10 coded frame and P8 coded frame as IP2 frame (two frames). As a result, the P11 coded frame that is nearer to the B10 coded frame is re-decided as the picture output candidate frame and displayed. Therefore, the frame that is nearer to the true picture output candidate frame is output, whereby the transfers of GOPs are suppressed and a reproduced picture as smooth as possible can be obtained.

Next, a decoding device for performing decoding processing by using the above-described decoding method of the second embodiment will be described with reference to the drawings. A fundamental structure of this decoding device is the same as that shown in FIG. 3 in the first embodiment. The contents processed by the decoding means 40 and the picture output candidate frame deciding means 50 are different from those in the first embodiment. In addition, FIGS. 4 and 6, which are flowcharts shown in the first embodiment, are replaced with FIGS. 10 and 11, respectively.

Figure 10:
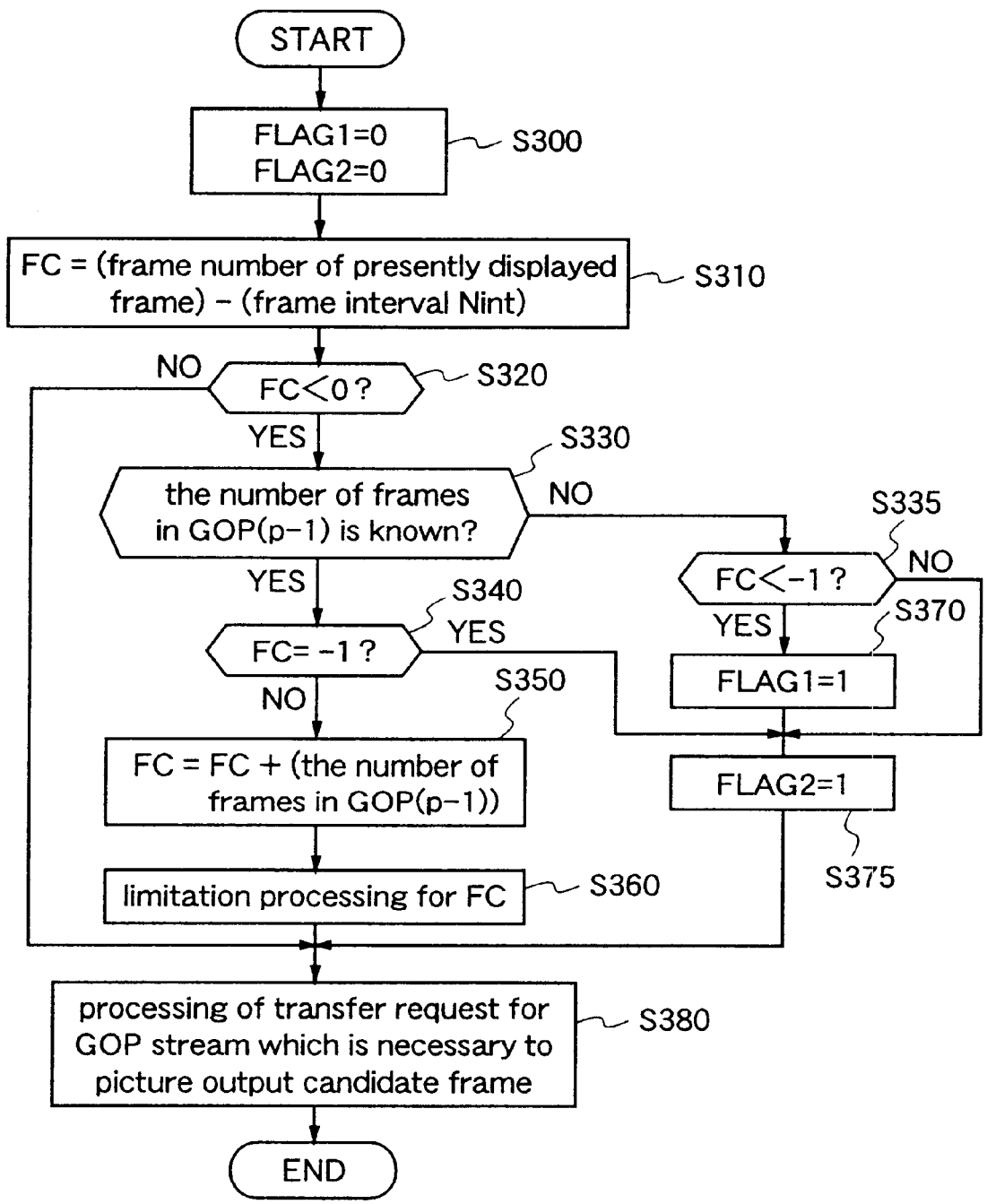
FIG. 10 is a flowchart showing an operation of a picture output candidate frame deciding means.

A method of deciding a picture output candidate frame by the picture output candidate frame deciding means 50 will be described with reference to a flowchart of FIG. 10.

Initially, FLAG1 and FLAG2 are reset to 0 (processing S300). Here, FLAG1 is a flag that is referred to in a processing of selecting a nearer frame among the IP1 or IP2 frames as a picture output candidate frame. FLAG2 is a flag showing that a processing which requires analysis of one whole GOP of GOP(p−1) is performed.

Next, a picture output candidate frame number FC which is a frame number of the picture output candidate frame is obtained by subtracting a frame interval Nint from a frame number of a presently displayed frame (processing S310). Here, the frame interval Nint is set by the frame interval setting means 60.

Then, this FC is compared with 0 (processing S320) and when it is 0 or more, the transfer request for a GOP which is required to picture output of the picture output candidate frame of FC is issued (processing S380). The GOP requested at this time is a GOP that is explained as an example in FIG. 1(c).

When it is judged that FC is below 0 from the result of the processing S320, it is judged whether the number of frames in a GOP (hereinafter referred to as GOP(p−1)) which is one GOP before a GOP (hereinafter referred to as GOP(p)) including a presently displayed frame is known (processing S330). When it is known, FC is compared with −1 (processing S340) and then when they do not coincide, a value obtained by adding the number of frames in GOP (p−1) to FC is newly decided as FC (processing S350). When it is judged that they coincide from the result of the processing S340, FLAG2 is set to 1 (processing S375) and it proceeds to processing S380.

On the other hand, when it is judged that the number of frames in GOP(p−1) is unknown from the result of the processing S330, FC is compared with −1 (processing S335) and when FC is −1 or more, it skips to processing S375. When FC is below −1, FLAG1 is set to 1 (processing S370) and it proceeds to processing S375. Then, after the processing S350, a prescribed limitation is imposed to FC as required (processing S360) and then it proceeds to processing S380. When a picture output candidate frame cannot be decoded completely only with the requested stream, the processing S360 is performed to reset a first I coded frame in GOP(p−1) to a picture output candidate frame, and this processing is the same as the processing S160 shown in the first embodiment.

Figure 11:
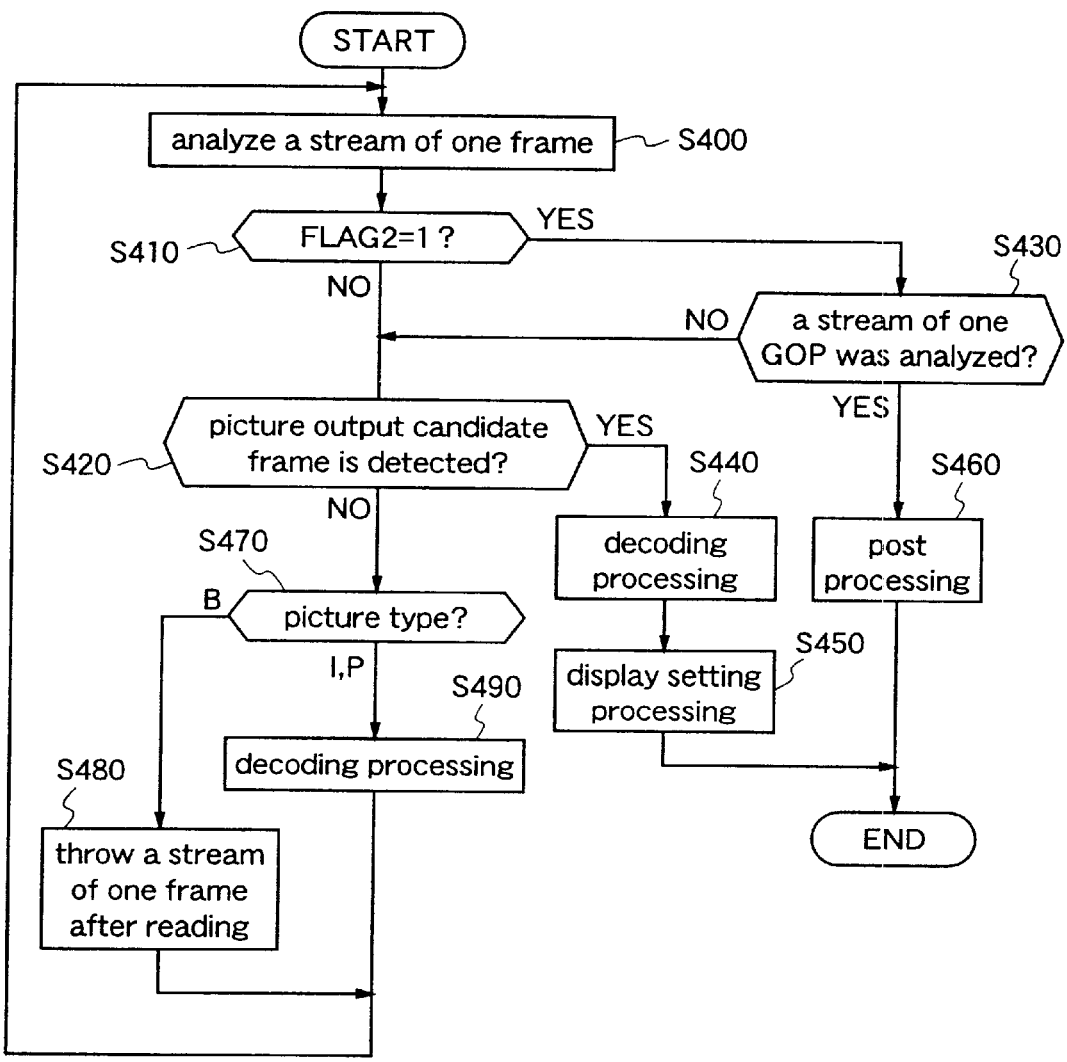
FIG. 11 is a flowchart showing an operation of a decoding means.

Next, a method of decoding a picture output candidate frame by the decoding means 40 will be described with reference to a flowchart in FIG. 11.

Initially, analysis processing for a stream of one frame among a stream of a GOP, a transfer request for which stream is issued to the outside, is performed (processing S400). Next, it is judged whether FLAG2 is 1 (processing S410). When it is not 1, it is judged whether a picture output candidate frame decided by the picture output candidate frame deciding means is detected (processing S420). That is, in the processing S420, it is judged whether a picture output candidate frame is detected by comparing FC with the analyzed GOP number and a frame number. This is the same as the processing S220 shown in the first embodiment.

When it is judged from the result of the processing S420 that the picture output candidate frame is detected, the decoding processing for a stream thereof is performed (processing S440) and display setting for that picture is performed (processing S450). At this time, a decoded picture is stored in the frame memory 30 and the picture output candidate frame deciding means 50 controls the frame memory 30 to output the decoded picture from the output terminal 80.

On the other hand, when it is judged from the result of the processing S420 that the picture output candidate frame is not detected, a picture type of the analyzed frame is judged (processing S470). When it is a B coded frame, a stream of one frame is thrown after being read (processing S480), and when it is an I or P coded frame, the decoding processing is performed (processing S490) and then it proceeds to processing S400. The decoded picture at this time is stored in the frame memory 30, but it is controlled by the picture output candidate frame deciding means 50 so as not to be displayed. During this time, a frame displayed immediately before is continuously displayed.

On the other hand, when FLAG2 is 1 in the processing S410, it is judged whether the analysis of a stream of one GOP is already finished (processing S430). As a result, when it is judged that the analysis is not finished, it proceeds to processing S420 and when the analysis is finished, post processing S460 is performed.

Figure 12:
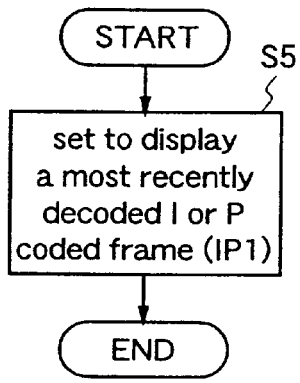
FIGS. 12(a)–(c) are flowcharts showing post processing.
Figure 12:
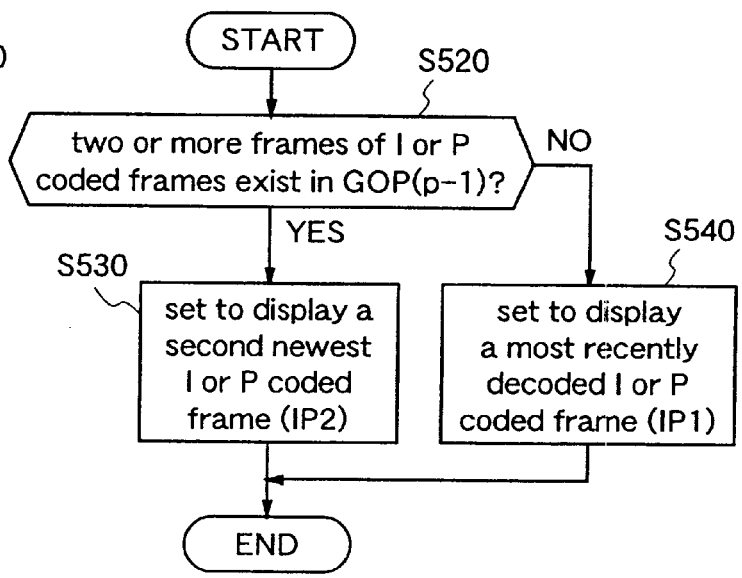
Figure 12:
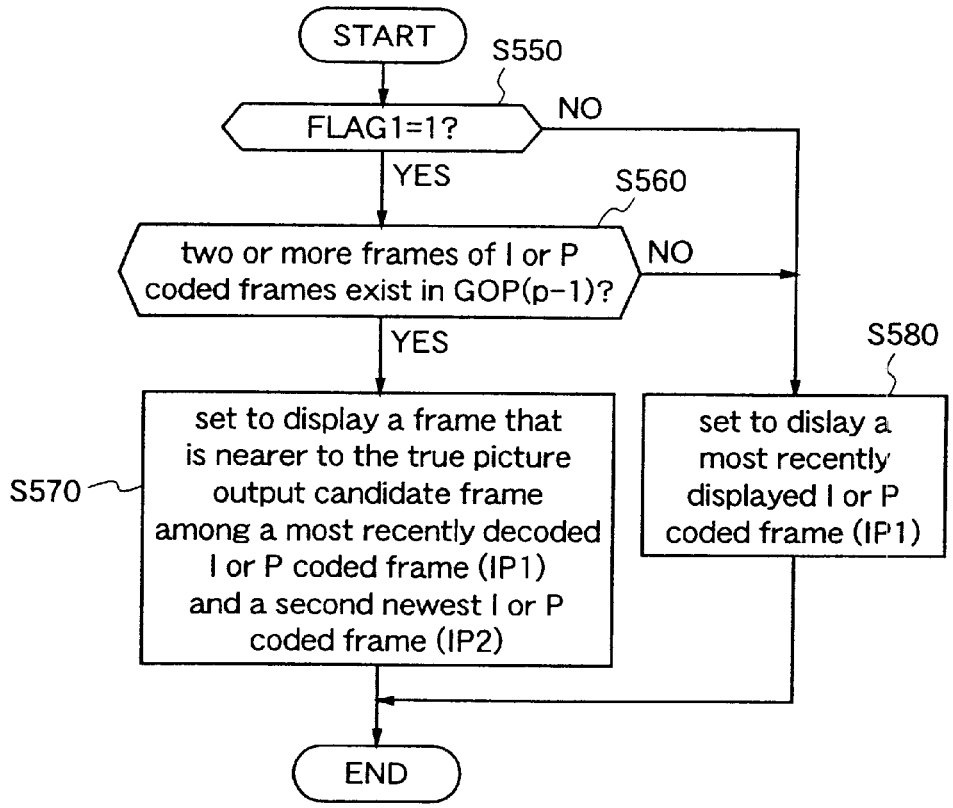

Here, the post processing S460 is a processing for deciding an alternate frame. FIG. 12(*a*) is a flowchart showing a case where an IP1 frame is decided as an alternate frame. FIG. 12(*b*) is a flowchart showing a case where an IP2 frame is decided as an alternate frame. FIG. 12(*c*) is a flowchart showing a case where a frame that is nearer to a true picture output candidate frame among the IP1 and IP2 frames is decided as an alternate frame. Hereinafter, these cases will be described successively.

Initially, in the case of FIG. 12(*a*) where the IP1 frame is the alternate frame, the IP1 frame is set to be displayed (processing S510).

Next, in the case of FIG. 12(*b*) where the IP2 frame is the alternate frame, it is judged whether two or more frames of I or P coded frames exist in GOP(p−1) (processing S520). When they exist, the IP2 frame is set to be displayed (processing S530) and when they do not exist, the IP1 frame is set to be displayed (processing S540).

Then, in the case of FIG. 12(*c*) where the IP2 is the alternate frame, FLAG1 is compared with 1 (processing S550) and when FLAG1 is not equal to 1, the IP1 frame is set to be displayed (processing 580). When FLAG1 is equal to 1, it is judged whether two or more frames of I or P coded frames exist in GOP(p−1) (processing S560). When they exist, a frame that is nearer to the true picture output candidate frame among the IP1 and IP2 frames is set to be displayed (processing S570). When they do not exist, the IP1 frame is set to be displayed (processing S580).

As described above, according to this second embodiment, by considering the presently displayed picture as a reference point, picture output candidate frames are decided such that the intervals between displayed pictures are uniform and decoded. Therefore, also at the inverse playback, pictures are reproduced at uniform frame intervals and the number of picture output frames increases with relative to the prior art method which displays only the first frame in each GOP, whereby a smooth reproduced picture is obtained. Further, an I or P coded frame which is most recently decoded among two frames of I and P coded frames stored in the frame memories is decided as a picture output candidate frame, whereby the reading operation and the decoding operation can be performed simultaneously and higher-speed inverse playback is realized.

The above-described embodiments can also be applied to a decoding method which adopts as a method of coding a stream "Information technology—Generic coding of moving pictures and associated audio for digital information" (ISO/IEC13818-2), which is commonly called MPEG2 being a superordinate standard of MPEG.

In all the above-described embodiments, a minimum unit of stream transfer is set to a GOP. However, these embodiments can be also applied to a decoding method in which a GOP group comprising a plurality of GOPs is used in place of a GOP.

What is claimed is:

1. A decoding device for dividing a moving picture into a plurality of continuous picture groups, receiving a code sequence which is obtained by performing coding processing to each of the picture groups as an input, and decoding independently coded frames which are coded independently within pictures, and predictively coded frames which are coded with reference to other frames of different times, to obtain a decoded picture, the decoding device comprising:

frame interval setting means for setting a frame interval for selecting frames at a prescribed interval from continuous frames;

frame deciding means for deciding, with a first frame which is presently displayed in the continuous frames as a reference point, a picture output candidate frame which is to be decoded later, based on the frame interval set by said frame interval setting means; and decoding means for decoding a code sequence corresponding to the picture output candidate frame decided by said frame deciding means, wherein when a number of frames in a second picture group preceding a first picture group including the first frame is unknown, said frame deciding means analyzes the code sequence to determine the number of frames in the second picture group and thereafter decides, as the picture output candidate frame, a frame which is nearer to the picture output candidate frame from among either a last predictively coded frame or a last independently coded frame in the second picture group, or a second to last predictively coded frame or a second to last independently coded frame in the second picture group.

2. The decoding device of claim 1, wherein when the decided picture output candidate frame cannot be completely decoded with only a code sequence corresponding to the second picture group, said frame deciding means decides a first independently coded frame included in the second picture group as the picture output candidate frame.

3. A decoding method for dividing a moving picture into a plurality of continuous picture groups, receiving a code sequence which is obtained by performing coding processing to each of the picture groups as an input, and decoding independently coded frames which are coded independently within pictures, and predictively coded frames which are coded with reference to other frames of different times, to obtain a decoded picture, the decoding method comprising:

setting a frame interval for selecting frames at a prescribed interval from continuous frames;

deciding, with a first frame which is presently displayed in the continuous frames as a reference point, a picture output candidate frame which is to be decoded later, based on the set frame interval; and decoding a code sequence corresponding to the picture output candidate frame decided in said deciding of the picture output candidate frame, wherein said deciding of the picture output candidate frame comprises:

judging whether or not a number of frames in a second picture group preceding a first picture group including the first frame is unknown;

when said judging of whether or not the number of frames in the second picture group judges that the number of frames is unknown, analyzing types of coded frames and numbers of the respective types of coded frames, which are included in the code sequence, to determine the number of frames; and selecting a frame which is nearer to the picture output candidate frame from among either a last predictively coded frame or a last independently coded frame in the second picture group, or a second to last predictively coded frame or a second to last independently coded frame in the second picture group and deciding the frame as the picture output candidate frame.

4. The decoding method of claim 3, wherein said deciding of the picture output candidate frame further comprises:

judging whether the decided picture output candidate frame can be completely decoded with only a code sequence corresponding to the second picture group; and when said judging of whether the decided picture output candidate frame can be completely decoded judges that the decoding cannot be completely performed with only the code sequence corresponding to the second picture group, designating a first independently coded frame included in the second picture group and deciding the frame as the picture output candidate frame.

* * * * *